United States Patent
Keihle et al.

(10) Patent No.: US 9,289,866 B2
(45) Date of Patent: Mar. 22, 2016

(54) COMPACT, PORTABLE RESISTANCE HEATING DEVICE

(71) Applicant: Xtreme Bolting Service, Inc., Claremore, OK (US)

(72) Inventors: Jody Lynn Keihle, Claremore, OK (US); Thomas William Decker, Claremore, OK (US)

(73) Assignee: Xtreme Bolting Service, Inc., Claremore, OK (US)

( * ) Notice: Subject to any disclaimer, the term of this patent is extended or adjusted under 35 U.S.C. 154(b) by 0 days.

(21) Appl. No.: 14/721,089

(22) Filed: May 26, 2015

(65) Prior Publication Data

US 2015/0251283 A1    Sep. 10, 2015

Related U.S. Application Data

(63) Continuation of application No. 12/113,513, filed on May 1, 2002, now Pat. No. 9,062,704.

(51) Int. Cl.
*H05B 3/00* (2006.01)
*B23P 19/06* (2006.01)
*B25B 29/02* (2006.01)
*F16B 31/04* (2006.01)

(52) U.S. Cl.
CPC ............... *B23P 19/068* (2013.01); *B25B 29/02* (2013.01); *F16B 31/04* (2013.01)

(58) Field of Classification Search
CPC .......... H05B 3/0014; H05B 3/40; H05B 3/42; H05B 3/54; H05B 6/62
USPC ......... 219/202, 205, 483–486, 492, 497, 494, 219/505, 506, 533, 535, 644, 772; 361/106, 361/600–603, 620, 828; 336/9, 64
See application file for complete search history.

(56) References Cited

U.S. PATENT DOCUMENTS

| | | | |
|---|---|---|---|
| 2,176,601 A | | 7/1937 | Bates |
| 3,500,272 A | * | 3/1970 | Fischer et al. ................. 336/60 |
| 3,771,209 A | | 11/1973 | Bennett, Jr. |
| 4,454,084 A | | 6/1984 | Smith et al. |
| 4,847,468 A | | 7/1989 | Hustetler |

(Continued)

FOREIGN PATENT DOCUMENTS

| | | |
|---|---|---|
| DE | 1922430 | 11/1970 |
| EP | 0858084 | 12/1998 |

*Primary Examiner* — Brian Jennison
(74) *Attorney, Agent, or Firm* — Head, Johnson & Kachigian, P.C.

(57) ABSTRACT

A compact, portable resistance heating device that takes a source of alternating current electricity and through a series of connections and circuitry splits the alternating current electricity into a plurality of circuits. The compact, portable resistance heating device is capable of heating a plurality of cartridge heaters at one time, individually or a combination thereof. The compact, portable resistance heating device is controlled by at least one controller that controls three (3) power output receptacles. The controller is capable of producing 0-100% output power to each respective cartridge heater. Each cartridge heater may be individually controlled by an on/off switch, and an indicator light may be provided and illuminate when each cartridge heater is energized. The cartridge heaters of the compact, portable resistance heating device do not require close tolerances with an axial bore of a stud or threaded bolt and are further capable of being bent to suit the particular operation.

14 Claims, 3 Drawing Sheets

(56) References Cited

U.S. PATENT DOCUMENTS

| | | |
|---|---|---|
| 5,196,673 A | 3/1993 | Tanis |
| 5,397,876 A | 3/1995 | Shimamoto et al. |
| 5,978,549 A | 11/1999 | Su |
| 5,994,682 A | 11/1999 | Kelly et al. |
| 6,018,137 A | 1/2000 | Reiff |
| 6,166,525 A * | 12/2000 | Crook .............................. 322/11 |
| 6,348,674 B1 | 2/2002 | Russell |
| 7,141,766 B2 | 11/2006 | Jorgensen et al. |
| 2002/0117495 A1 | 8/2002 | Kochman et al. |
| 2006/0201929 A1 * | 9/2006 | Jorgensen et al. ............ 219/497 |

* cited by examiner

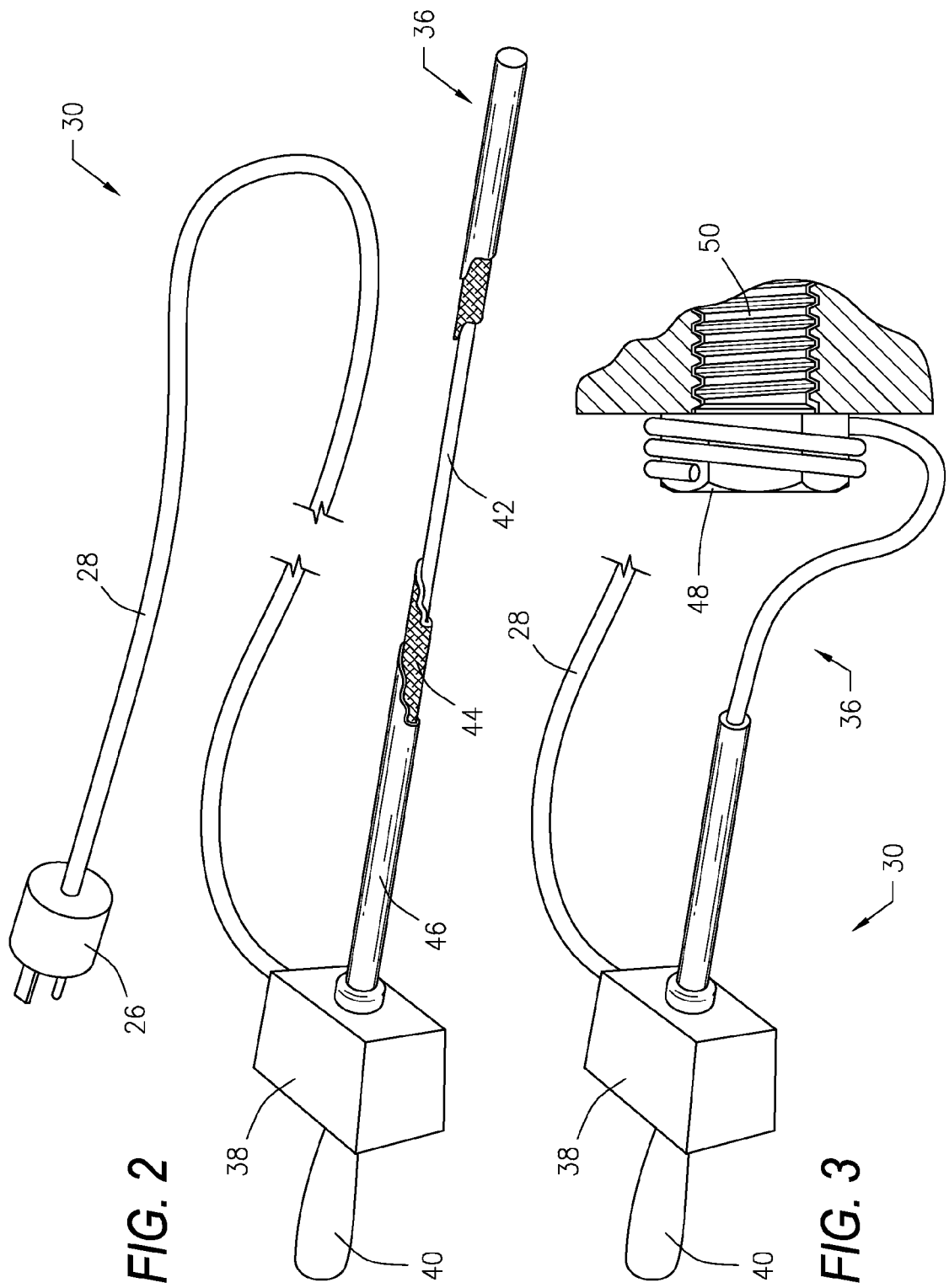

US 9,289,866 B2

COMPACT, PORTABLE RESISTANCE HEATING DEVICE

CROSS REFERENCE TO RELATED APPLICATIONS

This application is a continuation of U.S. patent application Ser. No. 12/113,513, filed May 1, 2008, which claims the benefit of U.S. Provisional Application Ser. No. 60/927,509, filed on May 4, 2007, each of which is incorporated herein by reference in their entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention

This invention relates generally to a compact, portable resistance heating device, and more particularly to a compact, portable resistance heating device for heating and stretching a rod or post, such as a stud or threaded bolt, on a steam turbine casing, a heat exchanger, or the like.

2. Description of the Related Art

Commonly, a bolt heater is used to fasten or loosen a bolt or stud used on steam turbine casings or the like that cannot be fastened or loosened by a wrench or spanner whereby the bolt heater raises the temperature of the bolt or stud by subjecting it to an alternating current electricity. The alternating current flowing from the bolt heater induces eddy currents in the bolt or stud and the resistance leads to Joule heating causing the bolt or stud to be become heated and stretch or elongate. Typically, the depth to which the eddy currents penetrate, and therefore the distribution of heat within the bolt or stud, depends on the frequency of the alternating current and the magnetic permeability, as well as the resistivity, of the bolt or stud. During this process, the bolt or stud will elongate or stretch due to expansion during heating, thereby allowing a nut to be threaded onto the bolt or stud to a greater degree during the fastening operation. As the bolt or stud cools and shrinks, the nut is pulled tautly against the surrounding surface of the turbine casing or heat exchanger. This process ensures a secure and firm connection of the nut on the bolt.

For removal of a bolt or stud, such as during servicing of the turbine or heat exchanger, the reverse process is followed. The bolt or stud is heated causing it to stretch, and in so doing, the nut moves away from the surrounding surface and lessens the force holding the nut against the surrounding surface of the turbine casing or heat exchanger.

Known resistance type bolt heaters operate at 240 volts or 480 volt, three-phase alternating current. Typically, these known bolt heaters are individually controlled and require five minutes or more to sufficiently heat and stretch each bolt for fastening or removal. In addition, these known resistance type bolt heaters require close tolerances between the axial bore of the bolt or stud and bolt heater. Further, the power output of these known resistance type bolt heaters cannot be varied and the bolt heaters cannot be removed from the bolt prior to cooling. If these known resistance type bolt heaters are removed from the bolt prior to cooling, the bolt heater will overheat and burn out because the produced heat is not dissipated. Furthermore, these known resistance type bolt heaters are not capable of being bent or shaped to fit the user's particular need.

A major limitation of these current brain stimulation therapies, however, is that they are all administered without regard to the natural, continuous, and ongoing fluctuations in the activity of a patient's brain.

It is therefore desirable to provide a compact, portable resistance heating device capable of heating and stretching a plurality of bolts or studs simultaneously regardless of the diameter of the bolt or stud.

It is further desirable to provide a compact, portable resistance heating device capable of heating and stretching a plurality of bolts or studs that do not have an axial bore or that have an axial bore either individually, in totality or a combination thereof.

It is still further desirable to provide a compact, portable resistance heating device that is sufficiently portable, compact and lightweight so as to be easily movable by a single user on a turbine deck, a deck of an oil refinery or the like.

It is yet further desirable to provide a compact, portable resistance heating device that does not require a cooling fluid, hydraulic pumps or air hammers during operation.

It is yet further desirable to provide a compact, portable resistance heating device having a selectively variable output power range from 0 to 100%.

It is yet further desirable to provide a compact, portable resistance heating device that utilizes a cartridge heater having a heating element that is not limited by clearance between the axial bore of the bolt or stud and the heating element.

It is yet further desirable to provide a compact, portable resistance heating device that utilizes a cartridge heater having a heating element that is capable of being bent or shaped.

It is yet further desirable to provide a compact, portable resistance heating device having a plurality of cartridge heaters that are capable of operation either individually or a combination thereof.

It is yet further desirable to provide a compact, portable resistance heating device capable of heating and stretching a bolt or stud in under five minutes time.

It is yet further desirable to provide a compact, portable resistance heating device that reduces man hours and outage times.

SUMMARY OF THE INVENTION

In general, in a first aspect, the invention relates to a compact, portable resistance heating device. The device includes a compact, portable housing configured to be connected to a source of three-phase alternating current electricity, with the three-phase alternating current electricity being split into separate legs of single-phase alternating current electricity. A step-down transformer is configured to power a controller, and the controller is configured to control a plurality of receptacles. The receptacles are connected to the housing and configured to receive the single-phase alternating current electricity. The controller is configured to selectively output the single-phase alternating current electricity to each of the receptacles.

The three-phase alternating current electricity may be 480 volt three-phase alternating current electricity, and the single-phase alternating current electricity may be 480 volt single-phase alternating current electricity. The transformer is not required to provide voltage recognition and may balance the electric output of each of the receptacles based on the number of powered cartridge heaters. The single-phase alternating current electricity can be varied from 0 to 100% using the controller, and for powering cartridge heaters either individually or in a combination thereof.

The housing of the compact, portable resistance heating device may further include an indicator lamp and an on/off switch associated with each of the receptacles. The on/off switch associated with each of the receptacles enables a user to selectively control an electric output of each of the receptacles.

The compact, portable resistance heating device for stretching a bolt may also include a plurality of cartridge heaters, wherein each of the cartridge heaters includes a cartridge heater cable at one end terminating with a plug configured to be received in one of the receptacles and having a heating element at an opposite end. Each of the cartridge heaters does not require close tolerances between the heating element and a bore of the bolt. Moreover, the heating element of each of the cartridge heaters may be bent, shaped or coiled. An on/off switch associated with each of the receptacles enables a user to selectively control an electric output of each of the receptacles, while each of the transformers balances the electric output to each of the receptacles based on the number of active receptacles.

The heating element of each of the cartridge heaters can further include a heating rod and a dielectric insulator sheathed within an outer casing. The dielectric insulator can be a dielectric fluid. Each of the cartridge heaters may be capable of providing high voltage, high wattage and low amperage, namely wattage of up to approximately 2000 watts and amperage between approximately 4 and approximately 30 amps.

In general, in a second aspect, the invention relates to a cartridge heater for a resistance heating device. The cartridge heater includes a cartridge heater cable at one end terminating with a plug configured to be received in a receptacle and having a heating element at an opposite end. The heating element has an internal thermal conducting material surrounded by an intermediate layer of a dielectric insulator sheathed within an outer casing. The cartridge heater is configured to provide a wattage of up to approximately 2000 watts and an amperage between approximately 4 and approximately 30 amps.

The heating element may be bent, shaped or coiled. In addition, the dielectric insulator can be a dielectric fluid, such as a ferrous metal, namely nickel or chromium.

BRIEF DESCRIPTION OF THE DRAWINGS

FIG. 2 is a partial cutaway perspective view an example of a cartridge heater of the compact, portable resistance heating device in accordance with an illustrative embodiment of the compact, portable resistance heating device disclosed herein;

FIG. 3 is a perspective view of another example of a cartridge heater of the compact, portable resistance heating device in accordance with an illustrative embodiment of the compact, portable resistance heating device disclosed herein.

Figure 1:
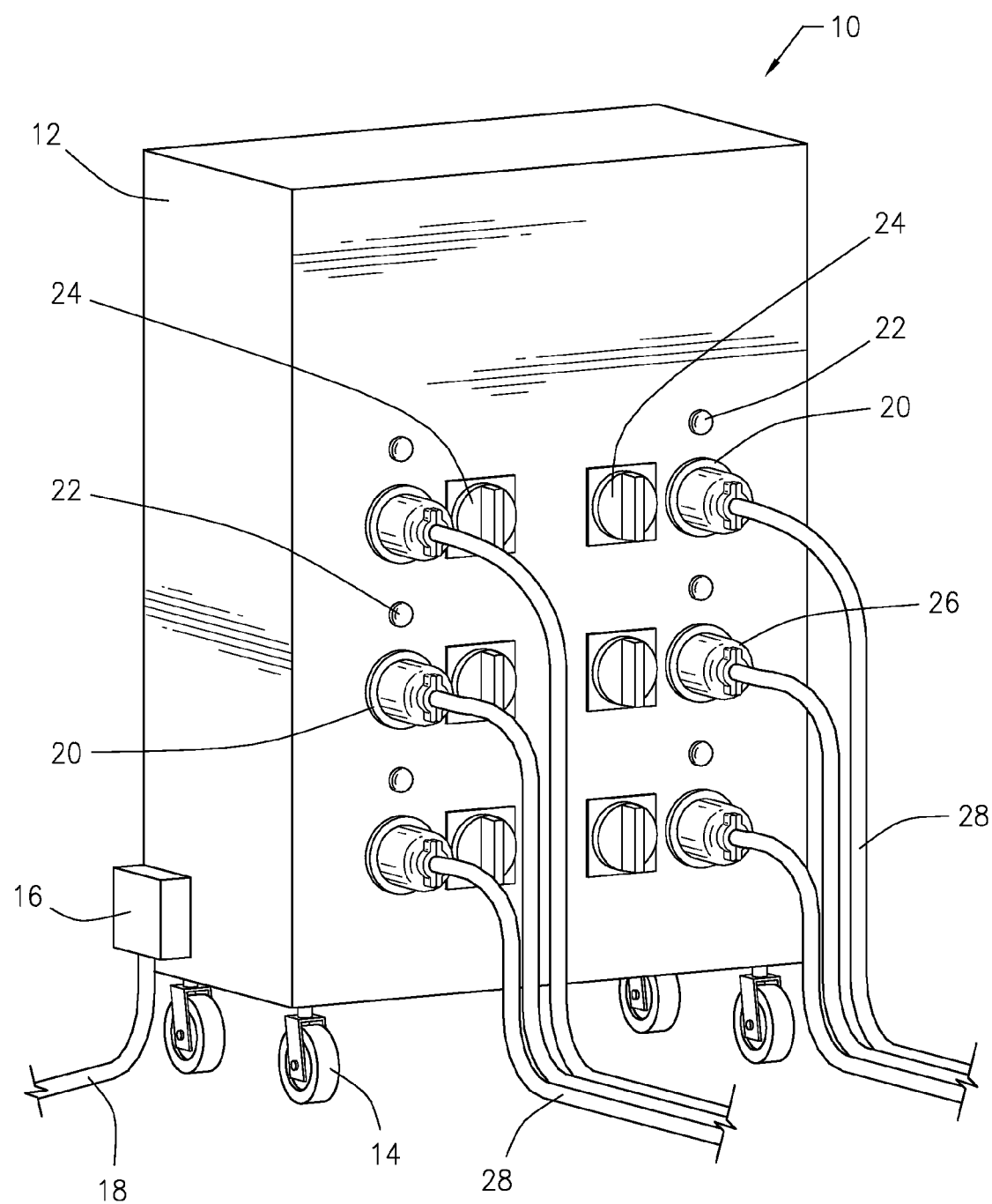
FIG. 1 is a perspective view of an example of a compact, portable resistance heating device in accordance with an illustrative embodiment of the compact, portable resistance heating device disclosed herein.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the invention has been described with a certain degree of particularity, it is to be noted that many modifications may be made in the details of the construction and the arrangement of the elements and components of the devices and/or in the sequences and steps of the methods without departing from the scope of this disclosure. It is understood that the devices and methods are not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawings under discussion. These relative terms are for convenience of description and do not require that the machine be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Referring to the figures of the drawings, wherein like numerals of reference designate like elements throughout the several views, and initially to FIG. 1, a compact, portable resistance heating device 10 that may be used in a wide variety of environments, such as for heating and stretching studs or bolts of turbine casings in power plants or of heat exchangers in oil refineries. The compact, portable resistance heating device 10 should not be so limited to such environments, but is rather described with reference to such environments for exemplification purposes only.

As illustrated in FIG. 1, the compact, portable resistance heating device 10 includes a compact housing 12 capable of being easily moved from one location to another, such as on a plurality of wheels or casters 14. The compact housing 12 may be approximately 170 pounds (77.1107029 kilograms) and may be approximately two (2) feet (0.6096 meters) wide, two (2) feet (0.6096 meters) deep and two and one-half (2½) feet (0.762 meters) tall, thus allowing the compact housing 12 to be easily movable by a single user on a turbine deck or on a deck of an oil refinery. The compact housing 12 may include a junction box 16 for connection of a source of alternating current electricity 18, such as 480 volt, 60 amp three-phase alternating current electricity, from an external power source, such as deck power or by generator. The source of alternating current electricity 18 may be brought into the housing 12 and connected to a junction terminal block (not shown) secured within the junction box 16.

The housing 12 also includes a plurality of receptacles 20. Each of the receptacles 20 may include a corresponding indicator light 22 and on/off switch 24. Each indicator light 22 may be located adjacent to the respective receptacle 20 so as to alert the user that the receptacle is energized and ready for use. Also located adjacent to each receptacle 20 may be the respective on/off switch 24 allowing the user to selectively turn on or off the respective receptacle 20. Each receptacle 20 is configured to receive and be connected with a plug 26 on a terminal end of a cartridge heater cable 28 of a cartridge heater 30.

The housing 12 also includes components and circuitry for heating and stretching a rod or post, such as a stud or threaded bolt, on a steam turbine casing, a heat exchanger, or the like. The components and circuitry for the compact, portable resistance heating device 10 may be mounted to an interior portion of the housing 12. The compact, portable resistance heating device 10 includes at least one controller 32 connected to the source of alternating current electricity 18 for controlling at least one transformer 34, as fully discussed below with reference to FIG. 4. The controller 32 and transformer 34 control and power a plurality of the receptacles 20. The compact, portable resistance heating device 10 may also include a fan 56, a circuit breaker 52, fuses 62, fuse blocks 68, terminal blocks 58 and 64 and wiring arranged to deliver the source of alternating current electricity 18 through the controller 32 and transformer 34 to the plurality of receptacles 20 on the housing 12.

FIGS. 2 and 3 illustrate two examples of a cartridge heater 30 of the compact, portable resistance heating device 10, wherein each cartridge heater 30 includes the plug 26 on a terminal end of the cartridge heater cable 28. The plug 26 of the cartridge heater 30 is configured to receive and be connected to a receptacle 20 on the housing 12 of the compact, portable resistance heating device 10. The cartridge heater 30 also includes a heating element 36 connected to the cartridge heater cable 28 via a cartridge heater junction box 38. The cartridge heater junction box 38 may include a handle 40 to allow the user to hold and operate the cartridge heater 30. The heating element 36 of the cartridge heater 30 includes an internal heating rod 42 and a dielectric insulator 44 sheathed within an outer casing 46. The internal heating rod 42 is constructed of a thermal conducting material, such as a ferrous metal, for example nickel or chromium, whereas the dielectric insulator 44 may be a dielectric fluid. As illustrated in FIG. 2, the heating element 36 of the cartridge heater 30 is cylindrical and sized to be inserted into an axial hole or bore in a bolt or stud to heat and stretch the bolt for tightening or loosening. Because the cartridge heater 30 includes the dielectric insulator 44, the heating element 36 does not require close tolerances with the bore of the bolt or stud, which is of a benefit since the axial bore diameter of bolts or stud can and do vary for a particular job. By not requiring close tolerances between the heating element 36 and the bore, the presence of burrs or spurs within the axial bore of the bolt or stud does not pose any difficulties and allows the user to utilize any sized cartridge heater 30 for any job.

Further, the design of the cartridge heater 30 dramatically increases the life cycle of the cartridge heater 30. Because of this increased life cycle, the cartridge heater 30 may be reused in subsequent operations and is not required to be changed out during a particular job. In addition, the cartridge heater 30 of the compact, portable resistance heating device 10 utilizes 480 volt single-phase alternating current electricity provided and controlled by the controller 32 and transformer 34. The cartridge heater 30 may further utilize high wattage and low amperage, such as 2000 watts and 4 to 30 amps. Furthermore, the cartridge heaters 30 of the compact, portable resistance heating device 10 may be removed from the bore of the stud or bolt prior to being de-energized without the cartridge heater 30 overheating. The heating element 36 of the cartridge heater 30 also is capable of being bent or shaped to suit a particular job. Given the ability of heating element 36 of the cartridge heater 30 to be bent, the compact, portable resistance heating device 10 may be used on bolts or studs without an axial bore, such as on heat exchangers in oil refineries. As shown in FIG. 3, the heating element 36 of the cartridge heater 30 may be coiled around the outer diameter of the head 48 of a bolt or stud 50 for heating and stretching the bolt or stud during installation or removal operations.

During installation, the heating element 36 of the cartridge heater 30 is inserted into the axial bore of a stud or bolt without requiring close tolerances between the heating element 36 and the bore, or if the stud or bolt does not have an axial bore, the heating element 36 of the cartridge heater 30 is coiled around the head 48 of the stud or bolt 50. The cartridge heater 30 is energized with single-phase alternating current electricity by the user and the heating element 36 increases the temperature of the stud or bolt, causing it to stretch longitudinally. A threaded nut is then tightened onto the stud or bolt and the heating element 36 of the cartridge heater 30 is removed, allowing the stud or bolt to cool and shrink, thereby increasing the holding force of the nut on the stud or bolt. During removal of the nut from the stud or bolt, the reverse process is employed.

Figure 4:
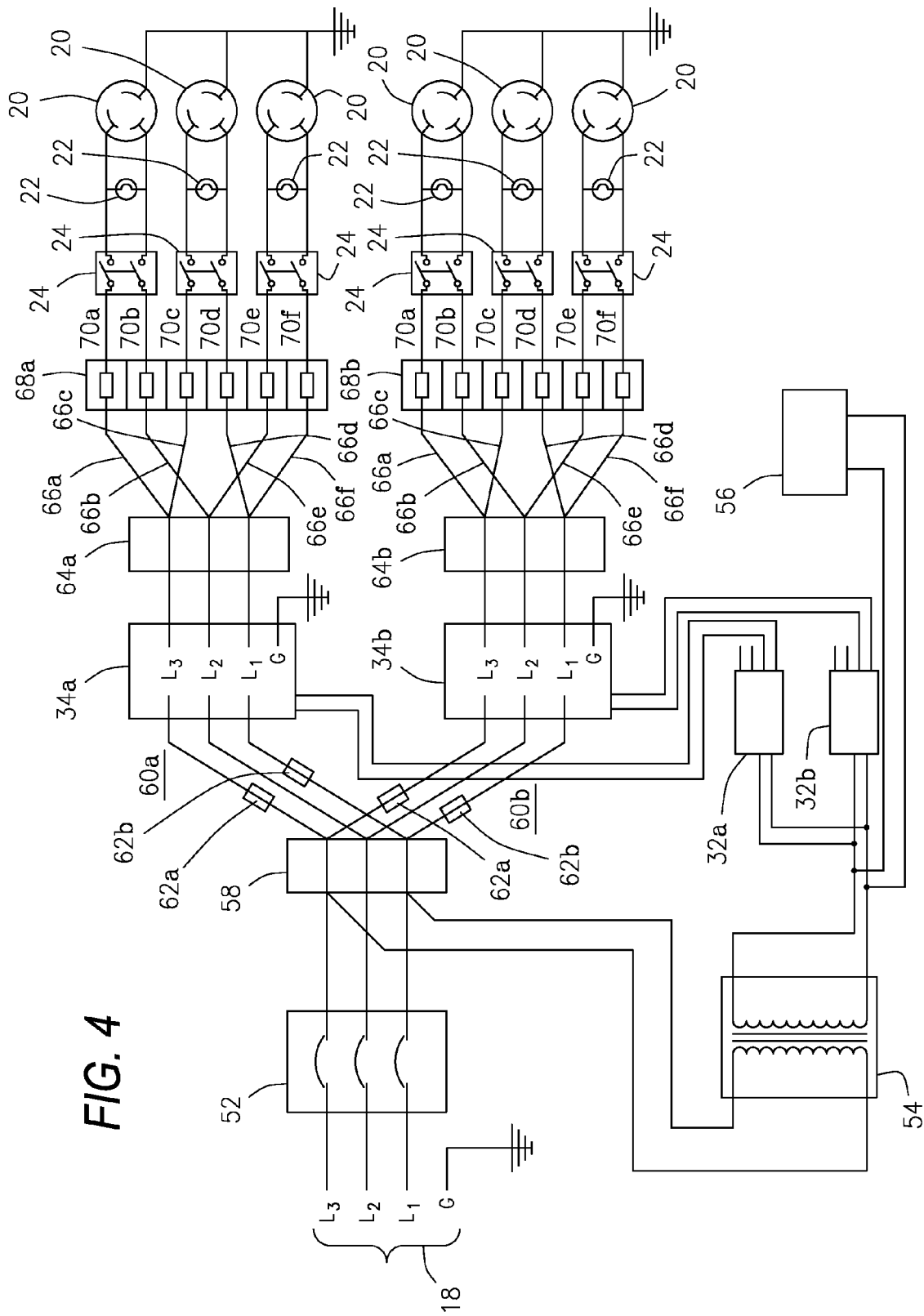
FIG. 4 is an electrical schematic of the compact, portable resistance heating device in accordance with an illustrative embodiment of the compact, portable resistance heating device disclosed herein.

FIG. 4 illustrates a schematic diagram of the compact, portable resistance heating device 10. As previously discussed, the source of three-phase alternating current electricity 18, such as 480 volt three-phase alternating current electricity, is connected to the junction terminal block secured within the junction box 16 of the housing 12 of the compact, portable resistance heating device 10. As shown in FIG. 4, the source of alternating current electricity 18 may supply power through three power lines L1 (black), L2 (white) and L3 (red) and a ground wire (G). The source of alternating current electricity 18 may be brought from the junction terminal block in the junction box 16 to a main breaker 52. The main breaker 52 may be a 480 volt/100 amp breaker. From the main breaker 52, two (2) phases of the three-phase alternating current electricity may be carried to a step-down transformer 54, such as a 480 volt/110 volt step-down transformer, to power a controller 32, a fan 56 and/or a transformer 34. For purposes of exemplification and as shown in FIG. 4, the step-down transformer 54 may power a plurality of controllers 32a and 32b, with each controller 32a and 32b controlling a respective transformer 34a and 34b. However, in keeping with the spirit and scope of the compact, portable resistance heating device 10, one skilled in the art will appreciate that the compact, portable resistance heating device 10 may utilize a single controller 32a to control a single transformer 34a, which in turn may power a plurality of circuits for providing power to the plurality of receptacles 20, as fully discussed below. Further, one skilled in the art will appreciate that additional controllers and transformers may be implemented to power and control additional circuits and additional receptacles.

The three-phase alternating current electricity 18 from the main breaker 52 may be connected in series with a first terminal block 58 along lines L1, L2 and L3. The first terminal block 58 may be secured to the housing 12 using bolts and locking nuts. When a plurality of controllers 32a and 32b and transformers 34a and 34b are implemented, the first terminal block 58 splits each phase of the three-phase alternating current electricity 18 across lines L1, L2, and L3 into two legs 60a and 60b, with each leg to run three (3) circuits of three (3) receptacles 20 each. From the first terminal block 58, two of the phases, which are now split, may be carried inline to fuses 62a and 62b by lines L1 and L3. The fuses 62a and 62b may be FWP-40 amp fuses mounted on a DIN rail. The fuses 62a and 62b may be provided inline so that they will burn out before any potential spikes in power are harmful to either the user or the transformer(s) 34a or 34b. Only two (2) of the three (3) phases (L1 and L3) are required to be inline with the fuses 62a and 62b, while one (1) of the phases (L2) need not pass through a fuse.

Once the three-phase alternating current electricity 18 has been split into two (2) legs 60a and 60b by the first terminal block 58 and two of the phases carried by lines L1 and L3 are passed through fuses 62a and 62b, each leg is carried to a respective transformer 34a and 34b. Each transformer 34a and 34b balances the load of the respective leg 60a and 60b of alternating current electricity 18 and provides no voltage recognition. Each transformer 34a and 34b recognizes the power draw based on the number of cartridge heaters 30 used, and thereby providing multiple, adjustable voltage to each cartridge heater 30. Each transformer 34a and 34b converts the respective leg 60a and 60b of the three-phase alternating current electricity 18 to single-phase alternating current electricity for powering the cartridge heaters 30. Each transformer 34a and 34b is powered and controlled by the respective controller 32a and 32b, such as with 24 volts. As previously described, each controller 32a and 32b is powered by the step-down transformer 54 with 110 volts alternating current. Further, each controller 32a and 32b is capable of 0-100% power output to the respective transformer 34a and 34b. Each of the controllers 32a and 32b control the power output to three (3) receptacles 20. Each or both of the controllers 32a and 32b may also include a thermocouple to monitor the ambient temperature within the housing 12 of the compact, portable resistance heating device 10. The step-down transformer 54 may also be used to power a fan 56 to keep the transformer 34a/34b cool during operation.

Once three-phase alternating current electricity 18 is passed through a transformer 34a and/or 34b, the single-phase alternating current electricity may be carried by lines L1, L2 and L3 to a second terminal block 64. Again for purposes of exemplification and as shown in FIG. 4, the compact, portable resistance heating device 10 may utilize a plurality of transformers 34a and 34b, and in such a case, the single-phase alternating current electricity is passed from the respective transformer 34a/34b to a respective second terminal block 64a/64b. Each of the second terminal blocks 64a/64b split the single-phase alternating current electricity into two sets of six leads 66a through 66e, which is then passed to a fuse block 68a/68b to form three (3) circuits, wherein leads 66a and 66b form one circuit, leads 66c and 66d form a second circuit, and leads 66e and 66f form a third circuit. Each fuse block 68a and 68b may include six (6) fuses, such as KTK-15 or KTK-30 amp fuses, mounted on a DIN rail. Each circuit may comprise a receptacle 20, an indicator light 22 and an on/off switch 24. Each circuit is controlled by the respective controller 32a/32b and powered by the respective transformer 34a/34b. Each circuit is powered and fed through the fuse block 68a/68b. Main circuit power wires 70a and 70b, 70c and 70d, and 70e and 70f are routed to one of the on/off switches 24. The on/off switches 24 may be double pole, double throw ("DLDT") switches. The first termination point after the fuse block 68a/68b may be the bottom of the respective on/off switch 24. One of the main circuit power wires 70a/70c/70e may come out of the top of the on/off switch 24 to the bottom of the indicator light 22, while the other main circuit power wire 70b/70d/70f may come out of the top of the on/off switch 24 to the top of the indicator light 22. From the top of the indicator light 22 to the last termination point, the receptacle 20, one of the main circuit power wires 70a/70c/70e may go to one side of the receptacle 20 while the other main circuit power wire 70b/70d/70f may go to the other side of the receptacle 20. When the plug 26 on the terminal end of the conducting cable 28 of the cartridge heater 30 is connected to a respective receptacle 20, the circuit is complete causing the heating element 36 to energize instantaneously with single-phase alternating current electricity.

Whereas, the devices and methods have been described in relation to the drawings and claims, it should be understood that other and further modifications, apart from those shown or suggested herein, may be made within the scope of this invention.

What is claimed is:

1. A compact, portable resistance heating device, comprising:
   a compact, portable housing configured to be connected to a source of three-phase alternating current electricity; said device configured to split said three-phase alternating current electricity into separate legs of single-phase alternating current electricity; and
   a step-down transformer configured to power a controller; said transformer configured to provide no voltage recognition; said controller configured to control a plurality of receptacles; said receptacles connected to said housing and configured to receive said single-phase alternating current electricity; said controller configured to selectively output said single-phase alternating current electricity to each of said receptacles; and said controller configured to balance said electric output of each of said receptacles based on a number of powered cartridge heaters.

2. The compact, portable resistance heating device of claim 1 wherein said three-phase alternating current electricity is 480 volt three-phase alternating current electricity.

3. The compact, portable resistance heating device of claim 1 wherein said output of said single-phase alternating current electricity is 480 volt single-phase alternating current electricity.

4. The compact, portable resistance heating device of claim 1 wherein each of said cartridge heaters are configured to be powered individually or in a combination thereof.

5. The compact, portable resistance heating device of claim 1 wherein said housing further includes an indicator lamp and an on/off switch associated with each of said receptacles.

6. The compact, portable resistance heating device of claim 5 wherein said on/off switch associated with each of said receptacles enables a user to selectively control an electric output of each of said receptacles.

7. The compact, portable resistance heating device of claim 1 wherein said controller is capable of varying said output of said single-phase alternating current electricity between 0% and 100%.

8. The compact, portable resistance heating device of claim 7 wherein said controller comprises a plurality of controllers electrically connected to said step-down transformer.

9. The compact, portable resistance heating device of claim 7 further comprising a plurality of circuits for respectively providing said single-phase alternating current electricity to a plurality of receptacles.

10. The compact, portable resistance heating device of claim 1 wherein said housing further includes an external junction box for connection of said source of three-phase alternating current electricity.

11. The compact, portable resistance heating device of claim 1 further comprising a circuit breaker arranged to deliver said source of three-phase alternating current electricity through said controller and said transformer to said plurality of receptacles.

12. The compact, portable resistance heating device of claim 1 further comprising a plurality of cartridge heaters configured to respectively output said single-phase alternating current electricity from said receptacles; wherein each of said cartridge heaters includes a cartridge heater cable at one end terminating with a plug configured to be received in one of said receptacles and having a heating element at an opposite end.

13. The compact, portable resistance heating device of claim 12 wherein said heating element of each of said cartridge heaters comprising an internal heating rod constructed of a thermal conducting material surrounded by a dielectric fluid insulator sheathed within an outer casing.

14. The compact, portable resistance heating device of claim 13 wherein each of said cartridge heaters provides wattage of up to approximately 2000 watts and amperage between approximately 4 and approximately 30 amps.

* * * * *